United States Patent [19]
Sturman et al.

[11] Patent Number: 5,960,813
[45] Date of Patent: Oct. 5, 1999

[54] SOLAR POWERED PROGRAMMABLE VALVE AND METHODS OF OPERATION THEREOF

[76] Inventors: Oded E. Sturman, One Innovation Way, Woodland Park, Colo. 80863; Benjamin Grill, 9819 Etiwanda Ave., Northridge, Calif. 91325

[21] Appl. No.: 08/900,197

[22] Filed: Jul. 25, 1997

[51] Int. Cl.$^6$ .................................................. A01G 25/16
[52] U.S. Cl. ............................................ 137/78.3; 239/69
[58] Field of Search ................................ 137/78.1, 78.2, 137/78.3; 239/69

[56] References Cited

U.S. PATENT DOCUMENTS

| | | | |
|---|---|---|---|
| 3,212,714 | 10/1965 | Davis et al. | 137/78.2 |
| 3,313,939 | 4/1967 | Spencer . | |
| 3,683,239 | 8/1972 | Sturman | 317/150 |
| 3,743,898 | 7/1973 | Sturman | 317/154 |
| 3,821,967 | 7/1974 | Sturman et al. | 137/624.15 |
| 3,989,066 | 11/1976 | Sturman et al. | 137/624.2 |
| 4,107,546 | 8/1978 | Sturman et al. | 307/141 |
| 4,108,419 | 8/1978 | Sturman et al. | 251/30 |
| 4,114,647 | 9/1978 | Sturman et al. | 137/624.2 |
| 4,256,133 | 3/1981 | Coward et al. | 137/78.3 |
| 4,333,490 | 6/1982 | Enter, Sr. | 137/78.3 |
| 4,396,149 | 8/1983 | Hirsch | 239/64 |
| 4,541,563 | 9/1985 | Uetsuhara | 239/64 |
| 4,797,820 | 1/1989 | Wilson et al. | 137/624.13 |
| 4,852,802 | 8/1989 | Iggulden et al. | 239/64 |
| 4,980,574 | 12/1990 | Cirrito | 307/21 |
| 5,117,855 | 6/1992 | Goldsmith | 137/78.3 |
| 5,173,855 | 12/1992 | Nielsen et al. | 239/6.9 |
| 5,207,380 | 5/1993 | Harryman | 137/78.3 |
| 5,251,153 | 10/1993 | Nielsen et al. | 137/551 |
| 5,337,957 | 8/1994 | Olson | 137/78.3 |
| 5,341,831 | 8/1994 | Zur | 137/78.3 |
| 5,351,437 | 10/1994 | Lishman | 47/79 |
| 5,445,176 | 8/1995 | Goff | 137/78.3 |

FOREIGN PATENT DOCUMENTS

| | | |
|---|---|---|
| 0 519 887 A1 | 12/1992 | European Pat. Off. . |
| 2552623 | 9/1983 | France . |
| 3238073 | 10/1982 | Germany . |
| 535 004 | 3/1973 | Switzerland . |
| 2 076 117 | 11/1981 | United Kingdom . |
| WO8504120 | 3/1984 | WIPO . |
| WO8704275 | 1/1987 | WIPO . |

*Primary Examiner*—A. Michael Chambers
*Attorney, Agent, or Firm*—Blakely, Sokoloff, Taylor & Zafman LLP

[57] ABSTRACT

Solar powered programmable valves and methods of programming thereof are disclosed. A controller for the valves is provided having one or more solar cells for charging a large capacitor or capacitors upon illumination, which provide energy storage for the continuous powering of a very low current single chip computer controller and for providing actuating power to a latching solenoid of a pilot operated valve. Programming of the microcontroller to cause the valve to operate at subsequent times as desired is accomplished by magnetically actuating, through the sealed controller case, "yes" and "no" reed switches in response to simple prompts presented on a display. The use of solar power eliminates the need for batteries, and together with the non-intrusive programming, allows the controller to be totally sealed and free of control switches, battery cases and the like which can allow moisture entry and premature failure of the controller. Typical methods of programming the controller are disclosed. Alternate embodiments including an embodiment for multiple valve control are disclosed.

23 Claims, 8 Drawing Sheets

1. To operate YES or NO switches, touch them with wand, then move wand away.
2. To become familiar with this unit (or to review program at any time), repeatedly operate NO until "SET" flashes, then repeatedly operate YES to see program
3. Durations that you have set will change based on temperature and seasons.

SOLAR POWERED PROGRAMMABLE VALVE AND METHODS OF OPERATION THEREOF

BACKGROUND OF THE INVENTION

1. Field of the Invention.

The present invention relates to the field of automatic valves and valve controllers.

2. Prior Art.

In certain situations, it is desired to provide a control valve of some form and to provide a controller therefor which may be programmed to automatically control the valve as desired, frequently though not always in some form of 24 hour operating cycle. In that regard, solenoid valves and AC powered electrical timers and controllers therefor are well known and frequently used for various purposes. However in some situations, AC power is either not available or is inconvenient to provide at the precise location desired. Accordingly for such applications, various types of battery operated valves and valve controllers have been used. By way of specific example, sprinkler systems and other types of irrigation systems typically use valves with a time of day controller associated therewith. In such applications, it may be difficult or inconvenient to provide AC power for such valves and controllers, and accordingly battery operated valves and controllers have at times been used for such applications. Some specific types of prior art battery operated valves and controllers and other applications therefor are shown in U.S. Pat. No. 3,821,967, 3,989,066, 4,107,546, 4,108,419 and 4,114,647. Latching actuators usable in such valves are shown in U.S. Pat. No. 3,683,239 and 3,743,898.

In most applications for such controllers, it is highly preferred to mount the controller on or in close proximity with the valve, as the latching actuators in such valves tend to require a short but high current pulse for the operation thereof which could cause excessive voltage drops if one attempted to provide the current pulse from a remote location. Also, in most applications, it is common for the valve and thus the controller to be in a rather harsh environment, frequently having a high humidity or even being subject to direct impingement of water, and generally an environment subject to substantial daily temperature swings causing condensation to form on the controller, within any battery enclosure, etc., and at the same time causing cooling and contraction of the air within the controller, encouraging water or moist air into the controller enclosure and the condensation of the moisture in the air once within the enclosure.

Thus an object of the present invention is to provide a programmable pilot operated valve which is powered by solar power, and which is programmed in a simple, self prompting manner, with power and programming information being provided to the controller enclosure without ever having to open any enclosure such as a battery case to renew the power supply or having to seal any form of mechanical switches used for programming purposes.

BRIEF SUMMARY OF THE INVENTION

Solar powered programmable valves and methods of programming thereof are disclosed. A controller for the valves is provided having one or more solar cells for charging a large capacitor or capacitors upon illumination, which provide energy storage for the continuous powering of a very low current single chip computer controller and for providing actuating power to a latching solenoid of a pilot operated valve. Programming of the microcontroller to cause the valve to operate at subsequent times as desired is accomplished by magnetically actuating, through the sealed controller case, "yes" and "no" read switches in response to simple prompts presented on a display. The use of solar power eliminates the need for batteries, and together with the non intrusive programming, allows the controller to be totally sealed and free of control switches, power feedthroughs, battery cases and the like which can allow moisture entry and premature failure of the controller. Typical methods of programming the controller are disclosed. Alternate embodiments including an embodiment for multiple valve control are disclosed.

DETAILED DESCRIPTION OF THE INVENTION

Figure 1:
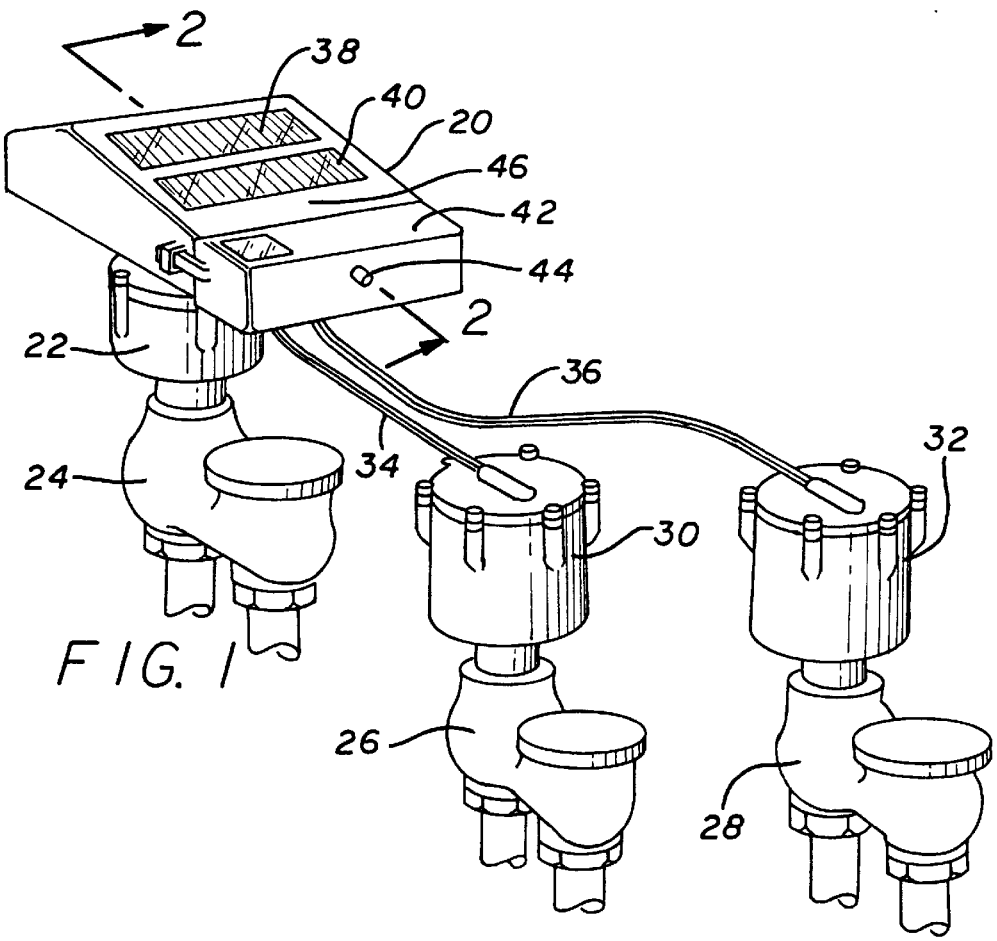
FIG. 1 is a perspective schematic view of one embodiment of the invention.

First referring to FIG. 1, a perspective view of one embodiment of the present invention may be seen. In this embodiment, the solar powered controller 20 is mounted on a valve actuator assembly 22, mounted in turn to an anti-siphon valve body 24. The anti-siphon valve may be a conventional anti-siphon valve readily commercially available, or alternatively, a special valve manufactured for this purpose. Also shown in FIG. 1 are additional anti-siphon valves 26 and 28, each with a pilot operated valve 30 and 32 mounted thereon, respectively. Pilot operated valves 30 and 32 may be, by way of example, in accordance with those shown in U.S. Pat. No. 4,114,647, or of that general type, containing a latching solenoid controlling a pilot valve, which in turn controls the main valve within the anti-siphon valve body. In this embodiment, these valves are controlled through lines 34 and 36 coupled beneath the body of solar controller 20. Also visible in FIG. 1 are solar panels 38 and 40, as well as a moisture sensor 42 and control 44 therefor.

Figure 2:
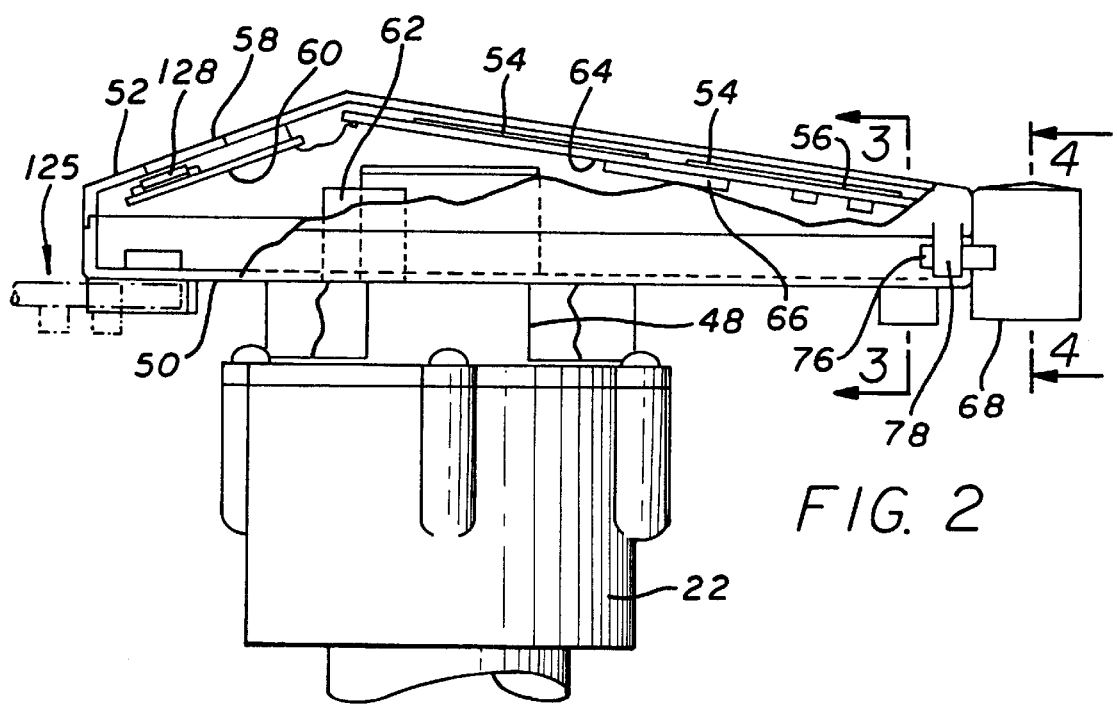
FIG. 2 is a cross-section of the solar controller of FIG. 1 taken along line 2—2 of FIG. 1.

Now referring to FIG. 2, a cross-section of the solar controller taken along line 2—2 of FIG. 1 may be seen. The pilot valve 22 has mounted thereon an actuator assembly 48 having the solenoid actuator and pilot valve actuating member therein. The body of the actuator assembly 48 includes bottom enclosure member 50 which, together with an upper enclosure member 52, solar panels 54 and liquid crystal display 58, form a sealed enclosure for the control system.

Figure 3:
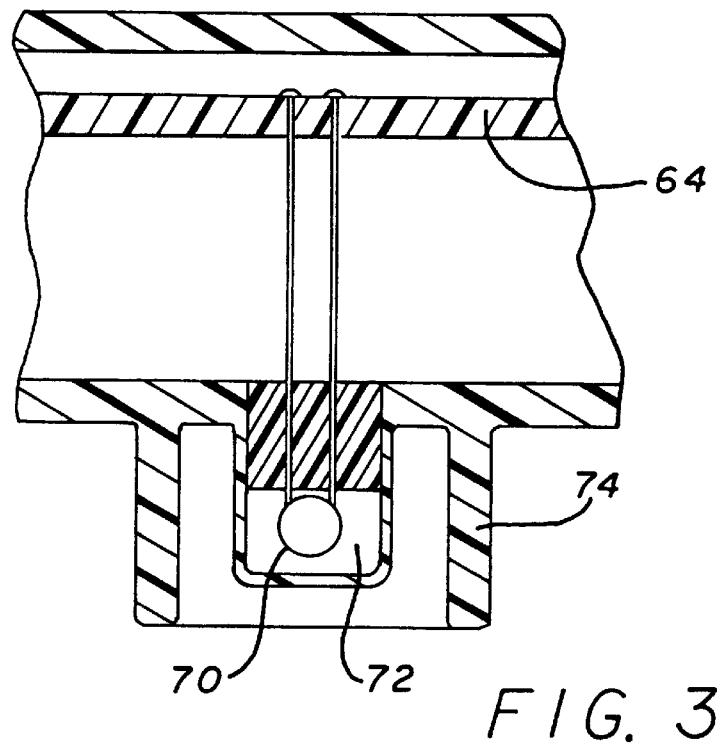
FIG. 3 is a cross-section taken along line 3—3 of FIG. 2.

Mounted within the enclosure is a circuit board 60 holding three magnetically sensitive switches, each of which may be independently operated by imposing a magnetic field adjacent to the outer surface of the enclosure in proximity to the respective switch. Also mounted within the enclosure is a super capacitor 62, as well as a second printed circuit board 64 containing microcontroller 66 and various other electronic components for the control system. Connected to printed board 64 is an additional magnetically sensitive switch which operates in conjunction with a moisture sensor 68 to be subsequently described. Finally, also mounted from printed board 64 is a thermistor 70, which may be seen in FIG. 3, a cross-section taken along line 3—3 of FIG. 2. The thermistor 70 is supported within a cavity 72 within the sealed enclosure, positioned at the bottom thereof. The thermistor 70 is reasonably well isolated from the main enclosure by a foam member so as to minimize the heating thereof from the main enclosure because of the direct sunlight on the controller, and to avoid air currents therefrom. It is also sheltered by member 74, both for physical protection and to prevent the direct impingement of rain and/or sprinkler water thereon, the evaporation of which could cause inaccurately low ambient temperature readings by the thermistor.

Figure 4:
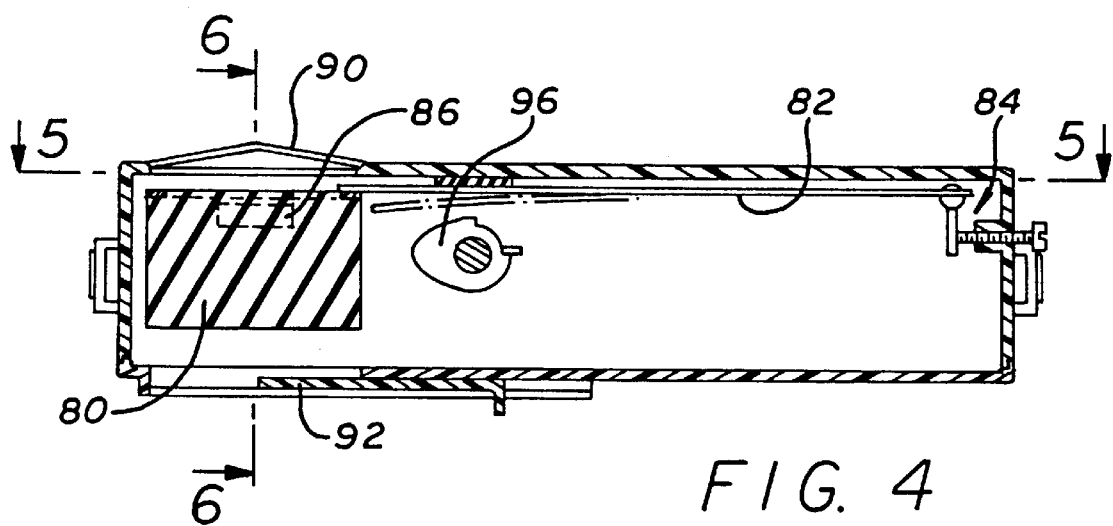
FIG. 4 is a cross-section taken through the moisture sensor of the present invention.
Figure 5:
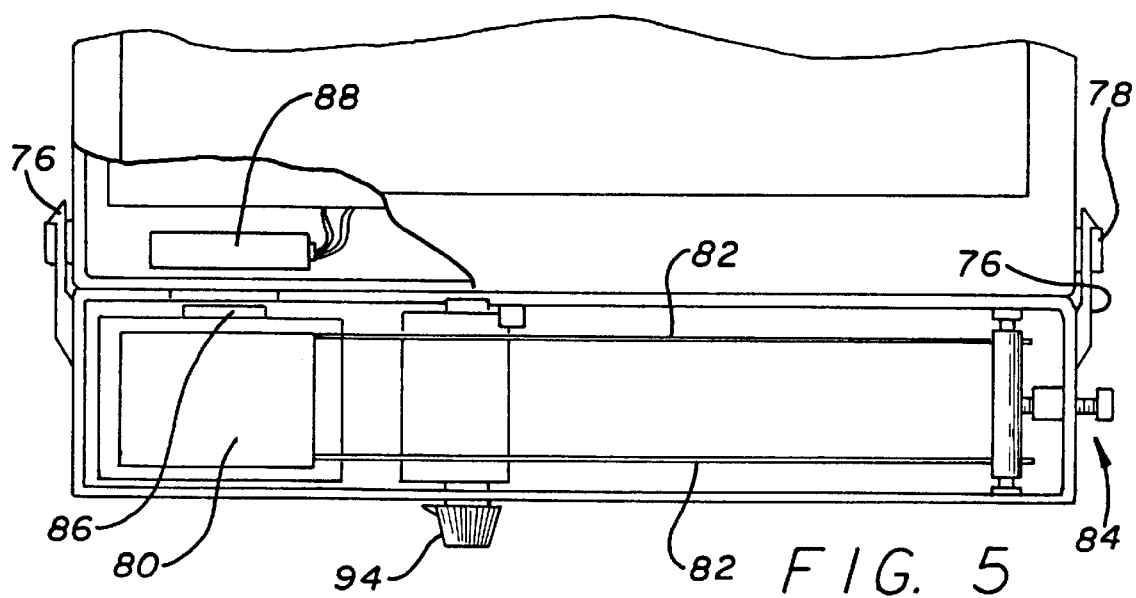
FIG. 5 is a top view of the moisture sensor of the present invention.
Figure 6:
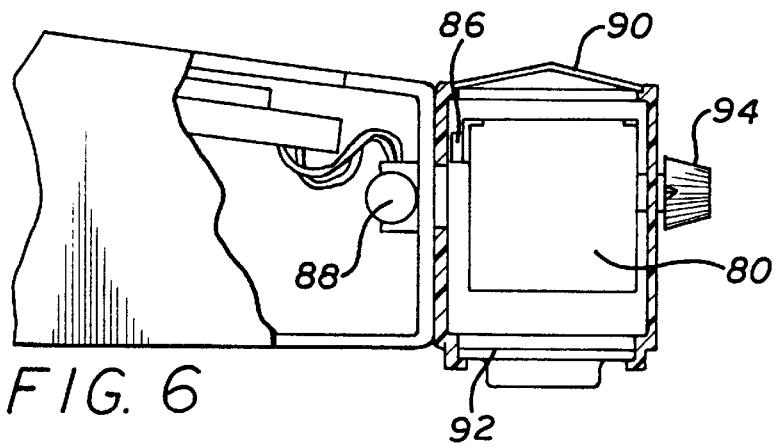
FIG. 6 is an end cross-section of the moisture sensor of the present invention.
Figure 7:
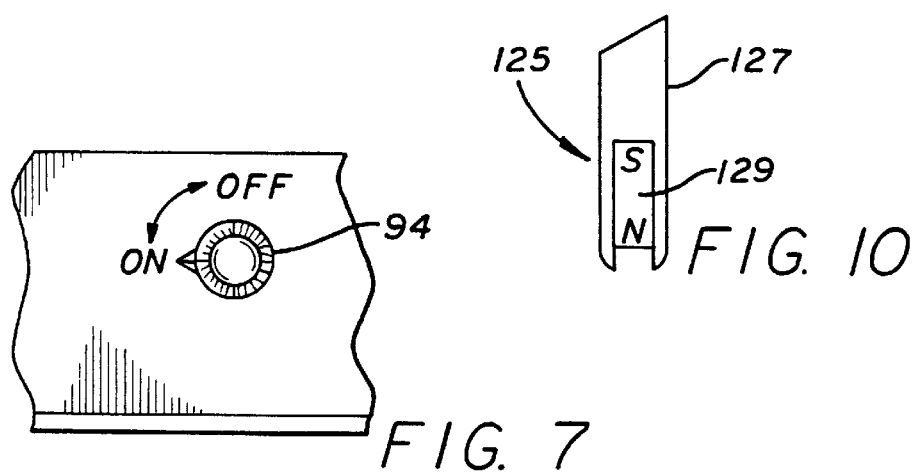
FIG. 7 is an illustration of the on-off control for the moisture sensor of the present invention.

The moisture sensor 68 shown in FIG. 2 is an optional feature and is configured with two tabs 76 (see FIGS. 2 and 5) for snapping into protrusions 78 on the controller enclosure. As may be seen in FIGS. 4 through 6, the moisture sensor is comprised of small, open top container 80 filled with foam and supported on stainless steel spring members 82 by adjustable support 84. A magnet 86 is positioned at the side of container 80, normally above the vertical position of a cooperatively disposed magnetic switch 88 within the controller enclosure. Normally, the switch 88 is open, though when container 80 becomes heavier because of the presence of rainwater therein, the spring members 82 will deflect, allowing container 80 to sag, bringing magnet 86 into close proximity with the magnetic switch 88 to close the switch. Screen cover 90 prevents leaves and other foreign material from clogging the moisture sensor, with adjustable bottom door 92 controlling the ventilation around the moisture sensor to control the rate at which the moisture will evaporate, and of course to allow excess water to pass there through. If desired, control 94 (see FIGS. 5 through 7) may be rotated to the off position, bringing cam 96 (see FIG. 4) into engagement with the spring members 82 to prevent the actuation of switch 88 by preventing the vertical deflection of container 80 under the weight of water in the foam.

Figure 8:
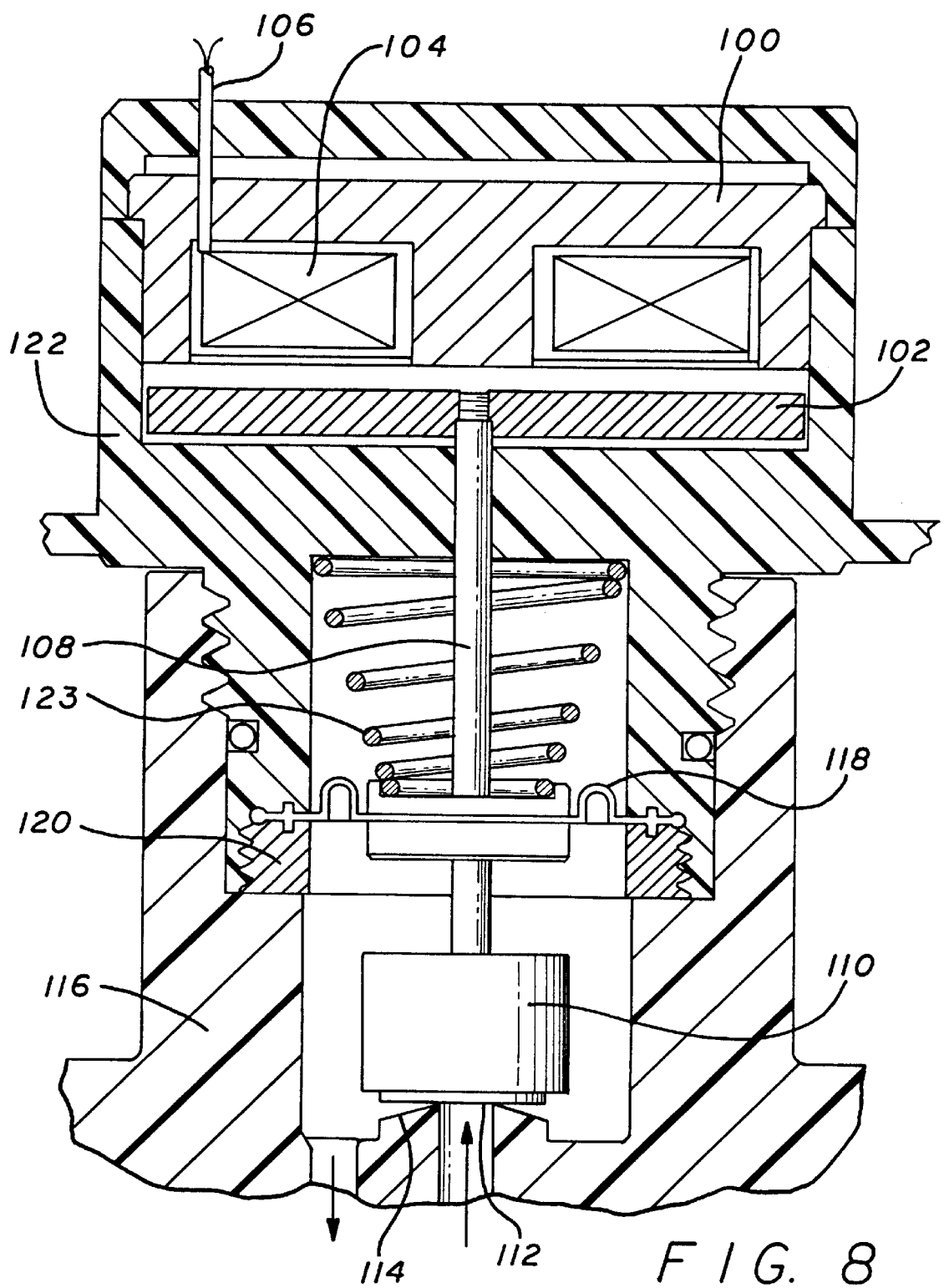
FIG. 8 is a cross-section taken through the actuator and pilot valve assembly 48 of FIG. 2.

Now referring to FIG. 8, a cross-section through the actuator and pilot valve assembly 48 of FIG. 2 may be seen. As shown therein, the solenoid actuator is comprised of a stationary magnetic member 100 and a movable magnetic member 102. Within stationary member 100 is a coil 104 connected to leads 106, in turn connected to the printed circuit board 64 of FIG. 2. The stationary and moving magnetic members may be, by way of example, members fabricated using powder metallurgy techniques, and preferably are reasonably soft magnetically so as to be reasonably easily magnetized and demagnetized as desired. In that regard, the general construction of such solenoid actuators is described in U.S. Pat. No. 3,743,898, with other examples being provided, by way of example, in U.S. Pat. 4,107,546.

The moving magnetic member 102 is connected through actuator rod 108 to a pilot valve closure member 110 having a rubber face 112 for mating with a valve seat 114 in a body member 116, into which the assembly is threaded. The upper region of the actuator assembly is sealed with respect to the region around pilot valve closure member 110 by a diaphragm 118 held in position by a diaphragm retaining member 120 threaded into actuator body 122, formed as an integral part of the base 50 (FIG. 2) of the controller enclosure. This body member 122 threads into body 116 in this embodiment in the same way that pilot valve solenoids fasten to commercially available pilot operated valves, whether of the anti-siphon type shown in FIG. 1 or other readily commercially available pilot operated valves. In that regard, body member 166 may be, by way of a further example, a top member fastened to the pilot operated valve of U.S. Pat. No. 4,108,419 obtained by shortening the valve housing and eliminating the internal solenoid actuator and pilot valve actuating member thereof. In any event, pilot operated valves are very well known and need not be described further herein.

A coil spring 123 normally maintains the pilot valve closed, though when the solenoid coil 104 is momentarily energized, the movable magnetic member 102 will be pulled against the stationary member 100 and retained thereby by the retentivity of the movable and stationary magnetic members to hold the pilot valve open. Thereafter, a controlled demagnetizing pulse in the solenoid coil 104 will reduce the field in the magnetic members so as to be easily overcome by the force of coil spring 123 to again close the valve.

Figure 9:
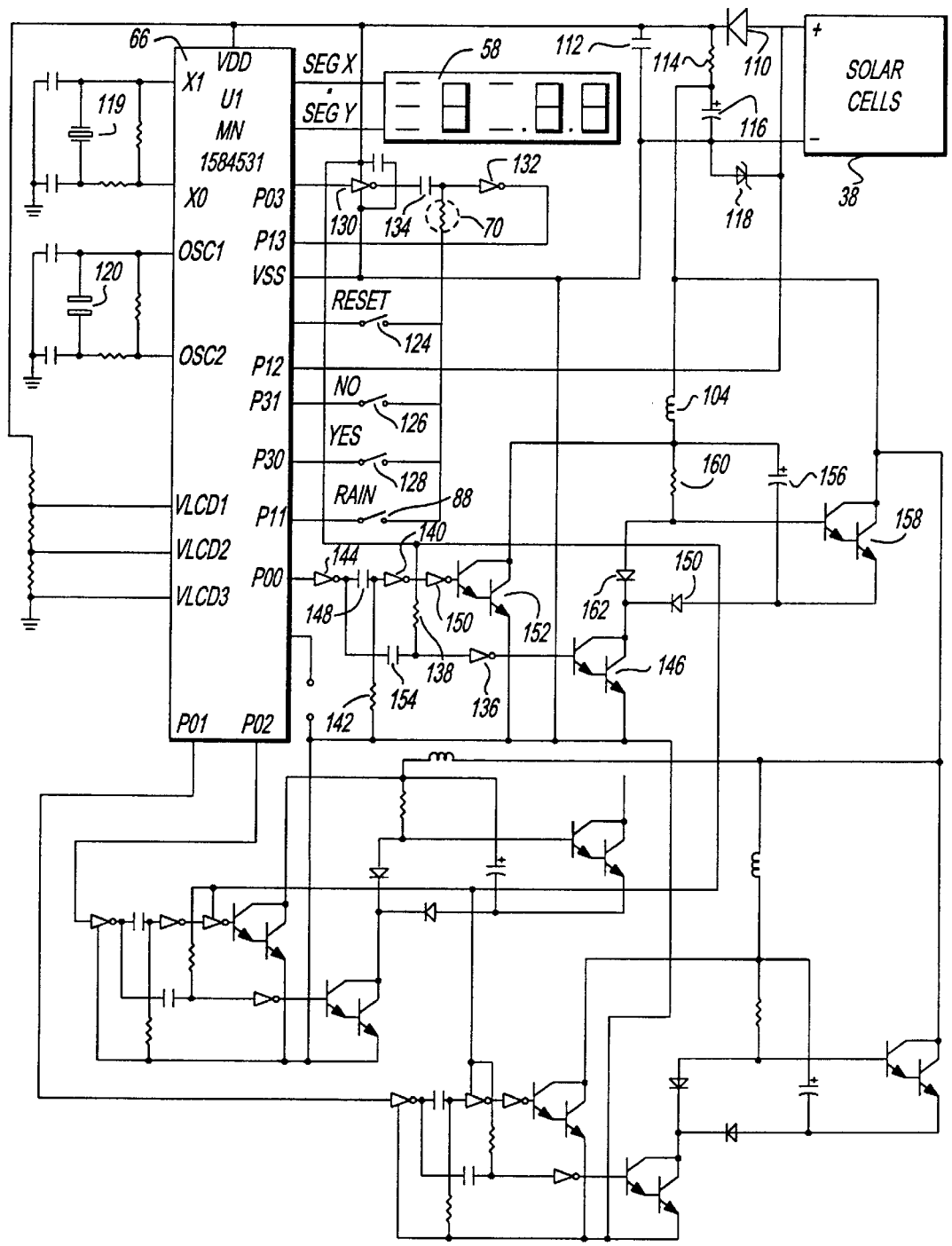
FIG. 9 is a circuit diagram for the exemplary embodiment of the invention of FIG. 1.

Now referring to FIG. 9, the circuit diagram for the exemplary embodiment of FIG. 1 may be seen. The solar cells 38, when illuminated, provide power through diode 110 to super capacitor 112, which in the preferred embodiment is a 2.2 farad 5.5 volt capacitor. Super capacitors are circuit components having characteristics of very large capacitors, namely a linear voltage versus stored charge characteristic, though unlike normal capacitors, have a reasonably high internal impedance so as to not be able to provide high discharge current pulses. The solar cells 38 also provide current through diode 110 and resistor 114 to charge capacitor 116, a conventional electrolytic capacitor. Zener diode 118 limits the output voltage of the solar cells to approximately 6 volts, with diode 110 limiting the charge on the super capacitor 112 and on electrolytic capacitor 116 to approximately 5.3 volts.

The voltage across the super capacitor is applied to the microcontroller 66 as the power supply voltages VDD and VSS. The microcontroller operates from a ceramic resonator 120 with a clock rate of approximately 455 KHz, though also includes a real-time quartz crystal clock oscillator 119 which allows the microcontroller to provide a time of day reference and a wake up from sleep mode reference for the microcontroller.

The microcontroller has various inputs and outputs from which to gather information and with which to control the operation of the pilot operated valve. Certain outputs control the liquid crystal display 58 (see also FIG. 2). Other outputs include the P00, P01 and P02 terminals of the microcontroller which control the actuating pulses for valves 22, 30 and 32 (see FIG. 1). Inputs to the microcontroller include a signal from a magnetically controlled reset switch 124, a magnetically controlled "no" switch 126, a magnetically controlled "yes" switch 128 (see also FIG. 2), and the magnetically controlled switch 88 (see FIGS. 5 and 6) of the rain sensor.

In operation, the voltage level on the P12 input terminal to the microcontroller is periodically sampled. During daylight hours, this voltage will be relatively high, indicating that the solar cells are active. In the nighttime hours, however, the output voltage of the solar cells 38 will be very low, detectable by the microcontroller as a low voltage on the input P12. This allows the microcontroller to determine the length of days, either individually or on a running average, which in turn are indicative of the time of year, and to use the time of the year to adjust the preset watering durations, longer for the longer days and shorter for the shorter days. Also periodically, the output on output pin P03, normally high, is driven low and then the voltage level on the input terminal P13 is monitored. Driving the output pin P03 low drives the output of inverter 130 high, and thus the output of inverter 132 low, though the output of inverter 132 will only remain low for a period dependent upon the RC time constant of capacitor 134 and the thermistor 70 (see FIG. 3). Thus, the duration that pin P13 remains low is an indication of the value of the resistance of the thermistor and thus, of the temperature. This allows the microcontroller to sample the temperature periodically between watering periods so as to further adjust watering duration based upon the average temperature between watering times. Once the input on pin P13 goes high so that the temperature measurement has in fact been made, the output on pin P03 will go high again before the next temperature reading cycle.

Coil K1 is the coil 104 (FIG. 8) of the pilot operated valve 22 of FIG. 1. In the quiescent state, the input to inverter 136 is held high by resistor 138. This holds the output of the inverter 136 low, holding Darlington pair 146 off. Resistor 160 holds the input base of Darlington pair 158 high, but since Darlington pair 146 is off, no current will flow through the Darlington pair 158 or through diode 162. Also, the input to inverter 140 is held low by resistor 142. This holds the output of inverter 140 high and the output of inverter 150 low, holding Darlington pair 152 off.

When the solenoid is to be actuated to open the pilot valve and in turn open the main valve, the microcontroller output P00 is driven low. This drives the output of inverter 144 high, which in turn drives the input to inverter 136 higher, the output of inverter 136 therefore remaining low so as to continue holding the Darlington pair 146 off. At the same time however, when the output of inverter 144 goes high, the output of inverter 140 is pulsed low for a time set by the RC time constant of resistor 142 and capacitor 148, pulsing the output of inverter 150 high to pulse on the Darlington pair 152 for a sufficient period to actuate and latch the solenoid actuator. Current flow while the Darlington pair 152 is turned on is from the positive side of capacitor 116, through coil 104, through the Darlington pair 152 and then back to the negative terminal of capacitor 116. In general, this actuating pulse is on the order of milliseconds in length, the charge removed from capacitor 116 during the pulse being replenished reasonably quickly thereafter by current from the super capacitor 112 through resistor 114.

When the pilot valve, and thus the main valve, is to be closed again, the output P00 of the microcontroller is driven high again. This drives the output of inverter 144 low, pulsing the input to inverter 140 even lower so that the output of inverter 140 and the input of inverter 150 remain high, holding the output of inverter 150 low and Darlington pair 152 off. However, driving the output of inverter 144 low pulses the input to inverter 136 low with a time constant determined by resistor 138 and capacitor 154, pulsing the output of inverter 136 high for the same time period. This turns on Darlington pair 146 for that time period, after which the same will turn off. While the Darlington pair 146 is turned on, current will flow through the solenoid coil 104 to charge capacitor 156 through diode 158 and Darlington pair 146. This current pulse through coil 104 is in the magnetizing or actuating direction and has no effect on the operation thereof. Also at this time, Darlington pair 158 is held off against current flow in resistor 160 by diode 162. At the end of the pulse, however, the charge on capacitor 156 holds the output emitter of the Darlington pair 158 low, though base current for the Darlington pair 158 is supplied through resistor 160, turning the same on. Now capacitor 156 is discharged through coil 104 and Darlington pair 158, providing a current pulse through coil 104 in the opposite direction to demagnetize the magnetic components in the actuator sufficiently to allow the spring to return the pilot valve to the closed position. For this purpose, capacitor 156 is carefully chosen in magnitude in relation to the characteristics of the actuator, as too strong a current pulse will merely remagnetize the magnetic components in the opposite direction to retain the actuator in the last condition, and too weak a current pulse will not sufficiently demagnetize the magnetic components to release the actuator.

In the circuit of FIG. 9, additional solenoid valve drive circuits are shown coupled to the P01 and P02 outputs of the microcontroller for driving solenoid coils K2 and K3. These drive circuits are identical to the drive circuit just described for driving coil K1, and may be used to drive the additional pilot operated valves through lines 34 and 36 as shown in FIG. 1. Preferably the drive circuitry, or most of it, is fabricated in integrated circuit form, so that drive circuitry is present for three valves, though preferably the controller would be offered in a single valve version also. For this purpose, a jumper connection J1 is provided during manufacture, the presence or absence of which may be detected by the microcontroller through one of its input/output pins. During programming, to be subsequently described, the microcontroller will sense whether the unit is a one valve unit or one capable of controlling three valves, and prompt the user through the programming of one valve or three valves accordingly. Jumper open may represent one or three valves, depending on the convention chosen.

Figure 10:
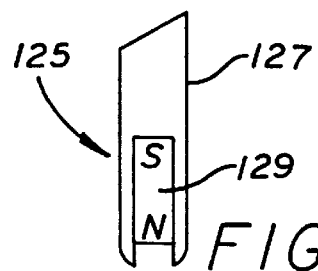
FIG. 10 is a view of the lower portion of the programming wand used to actuate the magnetic switches within the sealed controller enclosure to program and operate the controller of the present invention.

Now referring to FIG. 10, the lower portion of the programming wand used to actuate the magnetic switches within the sealed controller enclosure to program and operate the controller may be seen. The wand 125 may simply be a molded plastic member 127 having a hollow lower end into which a magnet 129 is pressed or bonded. The polarity of the magnet is not important, as the typical magnetic switch of the type used is merely sensitive to magnetic field strength, not polarity. The upper end of the wand may be configured to snap onto a cooperatively disposed protrusion under the controller for convenient storage (see FIG. 2).

Figure 11:
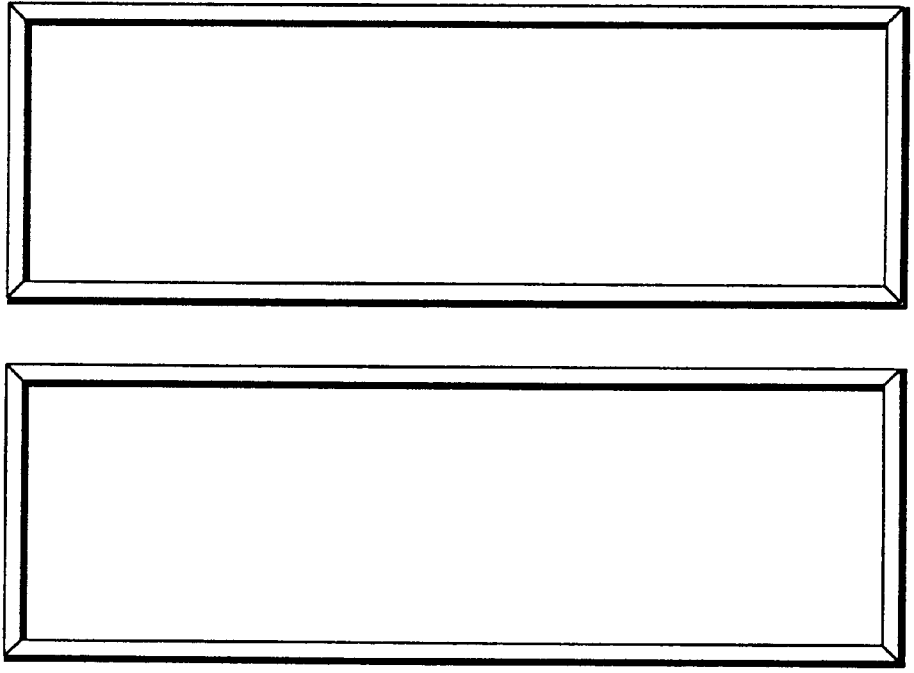
FIG. 11 is a face view of the display and the indicia surrounding the display printed on a decal on the face of the controller.
Figure 11:
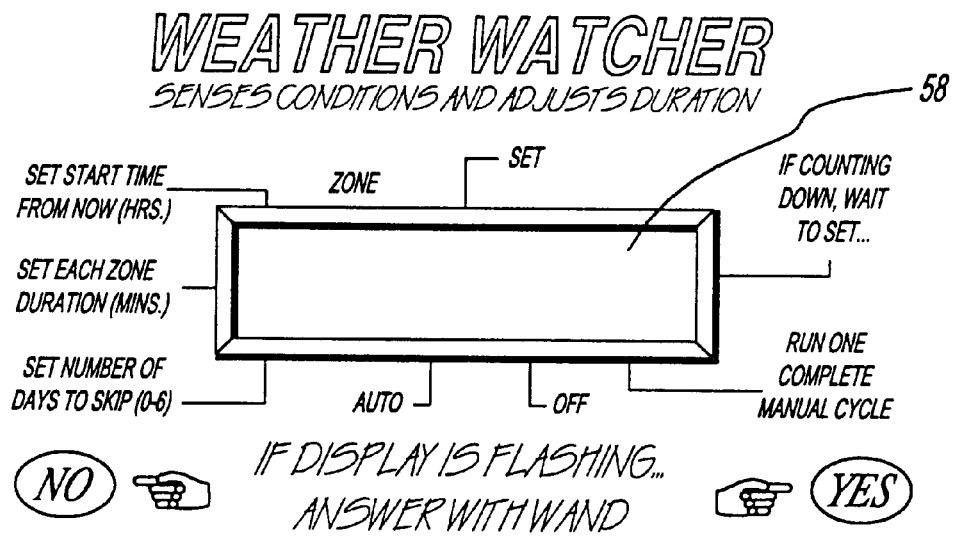
Figures 1, 12A:
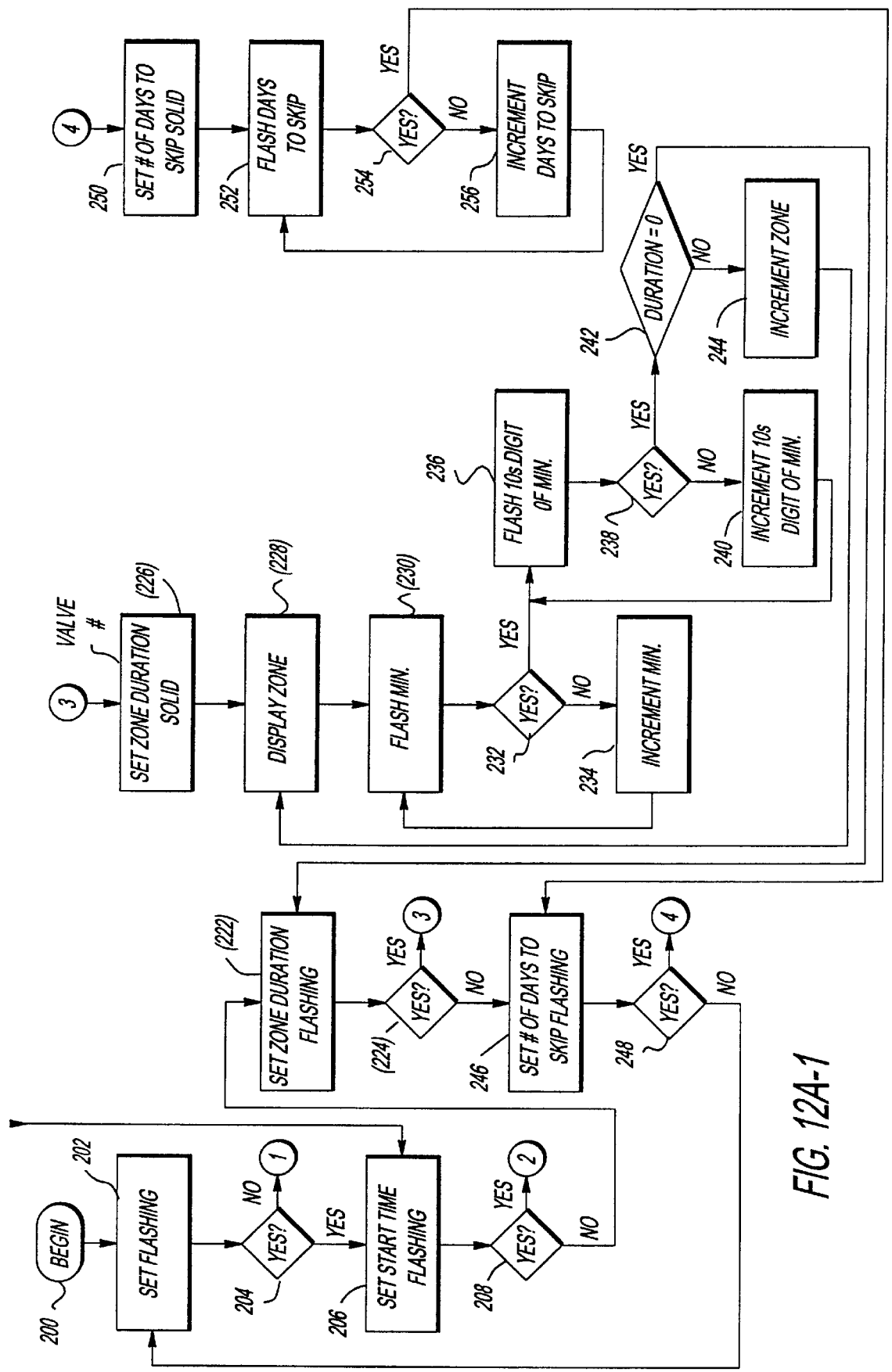
FIGS. 12a and 12b is a logic flow diagram for the microcontroller software to program the present invention controller.
Figure 12B:
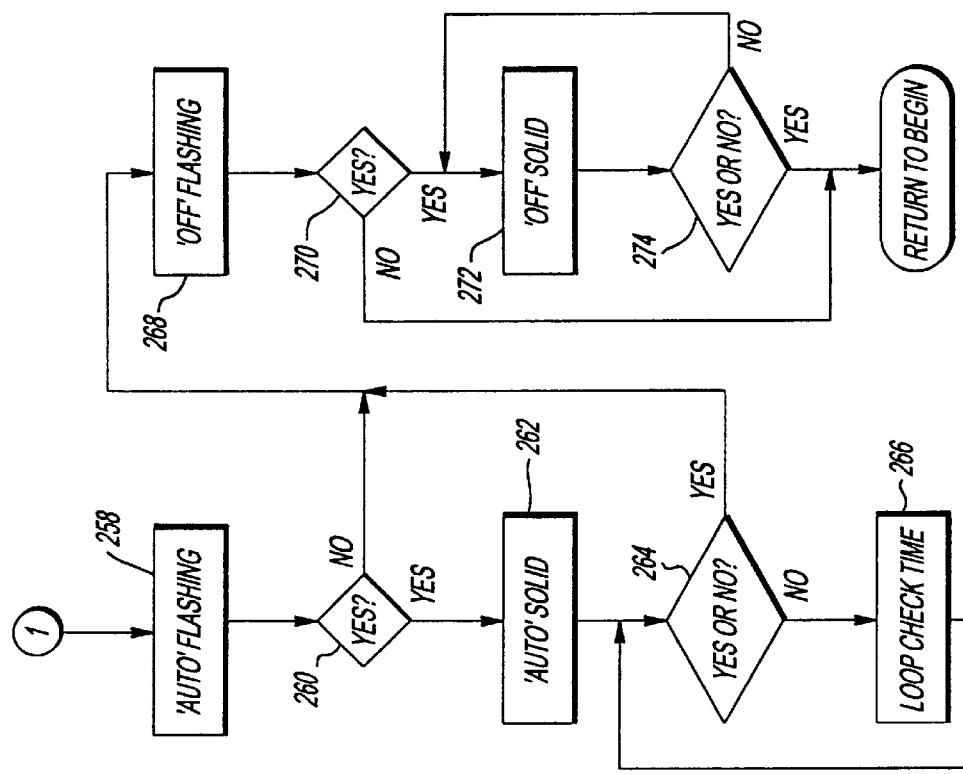
Figures 2, 12A:
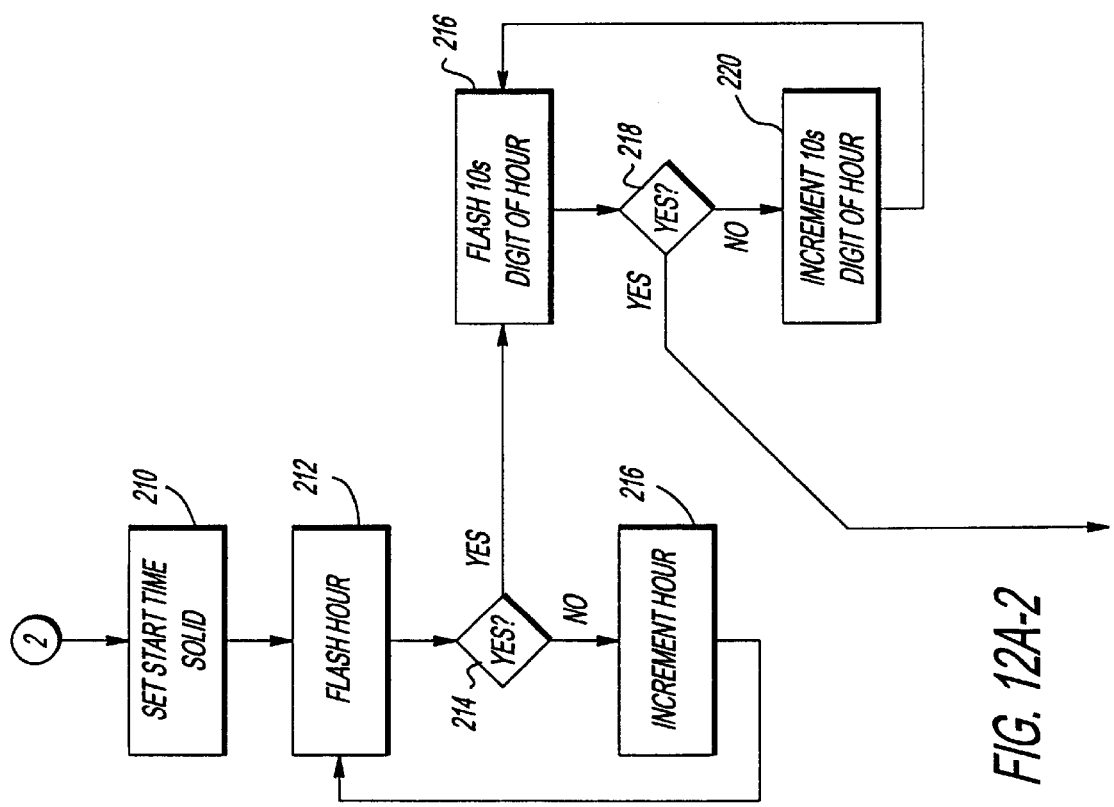

The programming for the microcontroller may be explained with reference to FIGS. 11 and 12. FIG. 11 is a face view of the display 58 and the indicia surrounding the display printed on a decal on the face of the controller. FIG. 12 is a logic flow diagram for the microcontroller to program the watering times, etc. The display itself is a seven segment alphanumeric LCD display which normally is off. To begin programming, the programming sequence is initiated by placing the end of the programming wand having a magnet therein adjacent either the "yes" indication (FIG. 11**) of the indicia surrounding the display. This signals the microcontroller, which polls the switches from time to time, to go to the programming routines (block 200 of FIG. 12). First the microcontroller goes to set flashing (block 202). This is accomplished in one embodiment by displaying the word "set" in a flashing form on the display (FIG. 11), or in another embodiment by flashing the segment of the display adjacent the word "set" on the case of the controller. In that regard, in the description to follow, the programming will be described in conjunction with the embodiment which flashes the segment adjacent the corresponding indicia on the controller case, though it is to be understood that an appropriate word or abbreviation may be flashed on the display to convey the same prompts.

In any event, the flashing of the "set" indication is a prompt to the user as to whether the user wants to set the parameters for the operation of the controller. Assuming the controller was not previously set, or a previous setting is to be changed, the user will actuate the "yes" switch, which will then flash the segment adjacent the "set start time from now" words on the controller case (block 206). Assuming this prompt is answered by actuation of the "yes" switch (block 208), the controller then stops the flashing and solidly displays the segment adjacent the "set start time" indication on the controller case (block 210) and then flashes a number starting from zero, indicative of the number of hours from the current time that the controller is to initiate the operating sequence of the pilot operated valve. One could, of course, alternatively use actual clock time, though that would require a separate sequence to set the time of day, not required when the operating time is measured from the time of programming. In any event, the "no" switch will be operated (block 214) when the hour indicated is not the desired time of operation as measured from current time, in which case the display will be incremented by one hour (block 216), with the new time flashed again (block 212) for a subsequent yes or no answer.

When the desired time in hours from the current time is displayed, the "yes" switch will be operated (block 214), in which case a decimal point and numerical digit will be displayed in the flashing mode. This is prompting the user to program time of operation from the current time in additional tenths of an hour (6 minute increments), which time increment in actual operation of the system will be added to the duration in hours from the current time for determining actual operation of the valve. Here again, the "no" switch is operated (block 218) to cause the tenths of an hour indication to be incremented (block 220) and the new tenths of an hour indication presented in a flashing mode (block 216) until the desired tenth of an hour indication is obtained. Thereafter, the "yes" switch will be operated (block 218), returning the programming routine to flash the segment adjacent the "set start time" (block 206).

Since the start time now has been set, the operator would actuate the "no" switch (block 208), causing the segment next to the words "set each zone duration" (block 222) to flash. The word "zone" in this context means controller number, the microcontroller stepping through the process for each of the three controllers if the jumper indicates to the microcontroller that it has the capability of controlling three pilot operated valves or, alternatively, once for the single valve controller embodiment, again as indicated by the jumper condition. Since the entire system is being set, the operator would actuate the "yes" switch (block 224), which would cause the segment next to the "set zone duration" to be solidly displayed (block 226) to display the zone number under consideration (block 228) and to flash the number of minutes that the respective valve is to be operated, starting from zero. The operator would normally actuate the "no" switch (block 232), which would cause an increment (block 234) in the number of minutes being flashed (block 230). This process would be repeated until the number of minutes flashing is equal to the valve operating duration desired, at which time the "yes" switch is actuated (block 232), which then causes a flashing of a digit starting with zero and preceded by a decimal point. This digit may be advanced by actuating the "no" switch (block 238), which results in the controller incrementing the digit (block 240) to flash the decimal point and the new digit (block 236) for the consideration of the operator. When the desired tenths of a minute (6 second increments) is displayed in a flashing mode, the "yes" switch will be actuated (block 238), after which the microcontroller will determine if all zones have been programmed (block 242). Of course, if it is a single valve unit, this will always be answered in the affirmative, returning the sequence to the setting of the flashing of the segment adjacent the "set each zone" words on the controller (block 222). If all zones have not been programmed, the zone number displayed is incremented (block 244) and the process just explained for setting the zone duration is repeated.

Since the zone duration has now been set, the flashing of the segment adjacent the words "set each zone duration" is resumed (block 222). However, this time the user will actuate the "no" switch (block 224), causing the segment next to the words "set number of days to skip" flashing (block 246). Here the user would actuate the "yes" switch (block 248), causing the segment next to the words "set number of days to skip" solid (block 250), and causing the flashing of a number starting from zero, corresponding to the number of days to be skipped (block 252). The number of days to be skipped are set by answering no (block 254), causing the flashing digit indicating the number of days to be skipped to be incremented (block 256). Skipping zero days at the lower extreme means operating the system every day, whereas at the other extreme, skipping six days means having the system operate once a week. When the flashing digit corresponds to the number of days to be skipped, the "yes" switch is operated (block 254), which returns to cause the segment next to the words "set number of days to skip" to be flashed (block 246). This time the user will actuate the "no" switch, which in turn will cause the segment adjacent the word "set" to flash (block 202).

In the description of the programming so far provided, it will be noted that each time some parameter for the operation of the system has been set, the logic will return to inquire whether that same parameter is to be set. This is not necessary, as the system could go on to the setting of the next parameter, though is believed desirable as it lets the user catch mistakes at the time they are made, or to verify the settings by reentering the setting of the respective parameter and then answering yes to each prompt while at the same time noting that the values of the parameters being prompted are correct. Also note that once the parameters have been set, any one parameter may be reset by going through the setting sequence, but answering no to all major prompts except that for the parameter to be reset.

On return to Block 202 with the segment adjacent the word "set" flashing, because the controller has already been set, the user will operate the "no" switch (block 204). This will cause the segment adjacent the word "Auto" to start flashing (Block 258), prompting the user to select automatic operation or not by operation of the yes or no switches. If yes is selected (Block 260), the segment adjacent the word "Auto" is made solid and the system proceeds with automatic operation in accordance with the parameters previously set.

Subsequent operation of the no switch (Block 264) merely causes the system to check itself (Block 266) and return to Block 264, thereby not interfering with the automatic operation of the system. If, on the other hand, the yes switch (Block 264) is actuated, or alternatively automatic operation was not selected (Block 260), the segment adjacent the word "Off" (FIG. 11) is caused to flash (Block 268). If "Off" is selected, the yes switch (Block 270) will be actuated, and the segment adjacent the word "Off" will be made solid (Block 272). If no further yes and no switch operations are made, then the system will remain off. Similarly, if the no switch is subsequently actuated (Block 274), the system will still remain off. In that regard, "off" in this context means that automatic operation will not occur, though "off" does not erase the various programming parameters previously entered. Consequently, a user can turn the system off if operation is to be temporarily interrupted, and turn the system back on again later without having to reprogram the various watering time durations.

Once the system is off, operation of the yes switch is required (Block 274) for the system to return to Block 200 to allow the user to select any aspect of the programming again to change settings. In that regard, note that if neither automatic operation or off is selected, the system will return to Block 200, initiating the series of prompts, which prompts will continue in one form or another until ultimately either automatic operation or off is selected. Consequently, one may by way of example, go from the off mode to reprogramming time to operation, watering duration, etc., and then again return to the off mode, thereby reprogramming the various parameters but remaining in the off mode until reprogrammed and/or at least placed in the automatic operation mode.

The specific design and the specific programming sequence described herein for the preferred embodiment of the present invention is exemplary only, and the same may be varied as desired. Of particular importance to the invention is the ability to power the device without having to have access to the internal part of the controller, or an unsealed external battery case of other compartment subject to leakage currents and poor contacts due to moisture and corrosion, and the ability to program the controller without using unsealed switches, rotary switches depending on O-ring or other seals subject to deterioration with time, etc. Also important is the ability of the system to automatically compensate for changing environmental conditions, automatically compensating for what normally requires operator intervention or a very elaborate and expensive system to achieve. The system preserves all the advantages of a battery operated system (no local 110 volt AC required, no running of power lines under sidewalks, patios, etc. required, etc.) yet has none of the disadvantages of a battery operated system (bad batteries, bad battery contacts, moisture leakage into the electronics, etc.).

In one of the embodiments just described, feedthroughs through the case are provided with snap-on type connectors being used to electrically connect to and to control two other valves from the same controller. Such feedthroughs can be molded into the case and therefore present no substantial opportunity for moisture leakage. Also, it has been found that problems associated with batteries such as leakage currents and electrolysis due to the constant voltage present do not occur when the contact is for very short current pulses rather than a perpetual voltage. Obviously even this can be avoided if desired by simply using a separate controller for each valve, though controlling multiple valves from a single controller has some advantages, such as a cost reduction and automatic successive operation of the multiple valves.

In the preferred embodiment, as stated before, the microcontroller operates from a ceramic resonator 120 (FIG. 11) with a clock rate of approximately 455 KHz, though also includes a real-time quartz crystal clock oscillator 119 which allows the microcontroller to provide a time of day reference and a wake up from sleep mode reference for the microcontroller. The microcontroller is programmed to check the status of everything, service any changes which have occurred since the last check, and to then enter a sleep mode, with the microcontroller waking up every few milliseconds to repeat the cycle. In this way, the microcontroller, being very fast, is in the sleep mode most of the time, but is active sufficiently frequently so that the delay imposed in responding to operator yes and no inputs is too short to be noticeable to a user. However the sleep mode conserves most of the power the microcontroller would otherwise consume, making the power consumption of the system very low. In that regard, the latching actuators in the valves themselves consume significant power, but operate for a very short time period per day, pulsing the valve open and then pulsing the valve closed but drawing no power when the valve is either open or closed. Therefore the entire system requires very little average powers and will easily sustain itself overnight even following a heavily overcast day. In fact, while the controller is easy to install, typically the system will be sufficiently charged during installation so that it will be ready for programming right after installation. If desired, the system could be configured and programmed to sense the voltage on the power supply and to skip valve actuation if the voltage is too low to be able to operate the valve or valves and still sustain itself overnight, though this is not believed necessary given the effectiveness of today's solar cells, the storage capacity that may reasonably be provided and the very high efficiency of the system. Similarly, rechargeable batteries could be used, but the super capacitors are preferred as providing all the storage needed, and as having a greater life, particularly without close control over the charge and discharge cycles.

While the present invention has been disclosed and described with respect to certain preferred embodiments thereof, it will be understood to those skilled in the art that the present invention may be varied without departing from the spirit and scope thereof.

What is claimed is:

1. A method of user programming a solar powered sprinkler system comprising:

(a) providing a sprinkler system controller having a display and being responsive to first and second magnetically sensitive switches, said sprinkler system controller, display, and magnetically sensitive switches being housed within an enclosure that is sealed against the intrusion of moisture;

(b) prompting messages on the display to operate the first and second magnetically sensitive switches, said switches being operated external to the enclosure; and, (c) programming the sprinkler system controller for watering time of day and watering duration using the operation of the magnetically sensitive switches responsive to the messages.

2. The method of claim 1 further comprised of the step of programming the sprinkler system controller for watering days using the operation of the magnetically sensitive switches responsive to the messages.

3. The method of claim 1 wherein steps (b) and (c) comprise the steps of prompting and programming for a single sprinkler valve.

4. The method of claim 1 wherein steps (b) and (c) comprise the steps of prompting and programming for multiple sprinkler valves.

5. A solar operated control comprising:

a latching actuator;

an enclosure sealed against the intrusion of moisture having:
- a solar panel for converting solar power incident thereto from outside the enclosure to electrical energy;
- a capacitor coupled to the solar panel for storing electrical energy from the solar panel;
- a microcontroller powered by the capacitor and coupled to the latching actuator to provide current pulses thereto to latch and unlatch the latching actuator;
- a display viewable from outside the enclosure, powered by the capacitor and responsive to the microcontroller to present prompts to a user;
- first and second magnetically sensitive switches coupled to the microcontroller; and
- a magnetic wand for actuating the first and second magnetically sensitive switches.

6. The solar operated control of claim 1 further comprised of a moisture sensor, the microcontroller being programmed to prevent operation of the latching actuator responsive to sensing the presence of water in the moisture sensor.

7. The solar operated control of claim 6 wherein the moisture sensor is sensitive to the weight of water therein.

8. The solar operated control of claim 4 wherein the moisture sensor comprises an open top container spring supported to deflect under the weight of water therein, the container having a magnet thereon positioned relative to a magnetically actuated switch within the enclosure coupled to the microcontroller.

9. The solar operated control of claim 1 wherein the microcontroller controls one latching actuator.

10. The solar operated control of claim 1 wherein the microcontroller controls more than one latching actuator.

11. The solar operated control of claim 1 wherein the microcontroller is programmed to prompt a user through programming of time of day and duration of operation of the latching actuator by presenting information to the user on the display and responding to the user's operation of the first and second magnetically sensitive switches responsive to the information presented on the display.

12. The solar operated control of claim 11 further comprised of a temperature sensor, the microcontroller also being programmed to alter the duration of operation of the latching actuator from that selected by the user responsive to the temperature sensor.

13. The solar operated control of claim 11 wherein the microcontroller is also coupled to the solar panel and is programmed to alter the duration of operation of the latching actuator from that selected by the user responsive to the length of days.

14. The solar operated control of claim 11 wherein the microcontroller is also coupled to the solar panel and is programmed to alter the duration of operation of the latching actuator from that selected by the user responsive to an output of the solar panel representative of an amount of solar power incident to the solar panel.

15. A solar operated valve and control comprising:

a valve;

a latching actuator coupled to the valve for controlling the valve;

an enclosure sealed against the intrusion of moisture having:
- a solar panel for converting solar power incident thereto from outside the enclosure to electrical energy;
- a capacitor coupled to the solar panel for storing electrical energy from the solar panel;
- a microcontroller powered by the capacitor and coupled to the latching actuator to provide current pulses thereto to latch and unlatch the latching actuator;
- a display viewable from outside the enclosure, powered by the capacitor and responsive to the microcontroller to present prompts to a user;
- first and second sensors coupled to the microcontroller and each responsive to the presence and the absence of a sensor stimulus outside the enclosure and adjacent the respective sensor; and
- a user operable device to controllably provide the sensor stimulus outside the enclosure and adjacent each of the sensors.

16. The solar operated power valve and control of claim 15 further comprised of a moisture sensor, the microcontroller being programmed to prevent operation of the valve responsive to sensing the presence of water in the moisture sensor.

17. The solar operated valve and control of claim 16 wherein the moisture sensor is sensitive to the weight of water therein.

18. The solar operated valve and control of claim 17 wherein the moisture sensor comprises an open top container spring supported to deflect under the weight of water therein, the container having a magnet thereon positioned relative to a magnetically actuated switch within the enclosure coupled to the microcontroller.

19. The solar operated valve and control of claim 15 wherein the microcontroller controls one latching actuator.

20. The solar operated valve and control of claim 15 wherein the microcontroller controls more than one latching actuator for controlling more than one valve.

21. The solar operated valve and control of claim 15 wherein the microcontroller is programmed to prompt a user through programming of time of day and duration of operation of the valve by presenting information to the user on the display and responding to the user's stimulation of the first and second sensors responsive to the information presented on the display.

22. The solar operated valve and control of claim 21 further comprised of a temperature sensor, the microcontroller also being programmed to alter the duration of operation of the valve from that selected by the user responsive to the temperature sensor.

23. The solar operated valve and control of claim 21 wherein the microcontroller is also coupled to the solar panel and is programmed to alter the duration of operation of the valve from that selected by the user responsive to the length of days.

* * * * *

UNITED STATES PATENT AND TRADEMARK OFFICE
CERTIFICATE OF CORRECTION

PATENT NO.       : 5,960,813                                    Page 1 of 1
APPLICATION NO.  : 08/900197
DATED            : October 5, 1999
INVENTOR(S)      : Oded E. Sturman et al.

It is certified that error appears in the above-identified patent and that said Letters Patent is hereby corrected as shown below:

In Claim 8, please delete "4" and insert --7--.

Signed and Sealed this

Twenty-seventh Day of March, 2007

JON W. DUDAS
*Director of the United States Patent and Trademark Office*